United States Patent
Ye et al.

(10) Patent No.: US 10,366,143 B2
(45) Date of Patent: Jul. 30, 2019

(54) METHOD AND SYSTEM FOR SELECTING ENCODING FORMAT FOR READING TARGET DOCUMENT

(71) Applicants: PEKING UNIVERSITY FOUNDER GROUP CO., LTD., Beijing (CN); FOUNDER APABI TECHNOLOGY LIMITED, Beijing (CN); PEKING UNIVERSITY, Beijing (CN)

(72) Inventors: Mao Ye, Beijing (CN); Wei Wan, Beijing (CN); Lifeng Jin, Beijing (CN); Yuanlong Wang, Beijing (CN)

(73) Assignee: PEKING UNIVERSITY FOUNDER GROUP CO., LTD., Beijing (CN)

(*) Notice: Subject to any disclaimer, the term of this patent is extended or adjusted under 35 U.S.C. 154(b) by 524 days.

(21) Appl. No.: 15/025,513

(22) PCT Filed: Dec. 6, 2013

(86) PCT No.: PCT/CN2013/088745
§ 371 (c)(1),
(2) Date: Mar. 28, 2016

(87) PCT Pub. No.: WO2015/043072
PCT Pub. Date: Apr. 2, 2015

(65) Prior Publication Data
US 2016/0239467 A1 Aug. 18, 2016

(30) Foreign Application Priority Data
Sep. 29, 2013 (CN) .......................... 2013 1 0456276

(51) Int. Cl.
| | |
|---|---|
| *G06F 17/00* | (2019.01) |
| *G06F 17/22* | (2006.01) |
| *G06F 9/451* | (2018.01) |
| *G06F 9/445* | (2018.01) |
| *G06F 17/21* | (2006.01) |

(52) U.S. Cl.
CPC .......... *G06F 17/2217* (2013.01); *G06F 9/445* (2013.01); *G06F 9/454* (2018.02); *G06F 17/211* (2013.01); *G06F 17/2252* (2013.01)

(58) Field of Classification Search
CPC ... G06F 17/2217; G06F 17/275; G06F 17/211
See application file for complete search history.

(56) References Cited

U.S. PATENT DOCUMENTS 6,049,869 A * 4/2000 Pickhardt .......... G06F 17/30985
707/E17.041
7,148,824 B1 * 12/2006 Porter, III ........... G06F 17/2217
341/90

(Continued)

FOREIGN PATENT DOCUMENTS

| CN | 101350858 | 1/2009 |
|---|---|---|
| CN | 101526963 | 9/2009 |

(Continued)

OTHER PUBLICATIONS

Japanese Office Action for JP2016-517326, dated Jun. 27, 2017 with translation.

(Continued)

*Primary Examiner* — Scott T Baderman
*Assistant Examiner* — Barbara M Level
(74) *Attorney, Agent, or Firm* — Brinks Gilson & Lione (57) ABSTRACT

A method and system for selecting an encoding format used for reading a target document are provided. The method comprises reading a reference document with at least one reference encoding format and determining all or some disorder code patterns obtained when reading the reference document with the reference encoding format; reading the target document with one encoding format each time; for each encoding format, comparing data generated when reading the target document with this encoding format and the determined disorder code patterns to determine disorder (Continued)

codes generated when reading the target document with this encoding format; counting disorder codes generated when reading the target document with each encoding format, and making a comparison to determine the encoding format used for reading the target document.

16 Claims, 1 Drawing Sheet

(56) References Cited

U.S. PATENT DOCUMENTS

| | | |
|---|---|---|
| 7,191,114 B1 | 3/2007 | Murray et al. |
| 2010/0153320 A1 | 6/2010 | Diao |

FOREIGN PATENT DOCUMENTS

| | | |
|---|---|---|
| CN | 102360392 | 2/2012 |
| CN | 102567293 | 7/2012 |
| JP | H09212334 A | 8/1997 |
| JP | 2000148754 A | 5/2000 |
| JP | 2007048284 A | 2/2007 |
| JP | 2010176237 A | 8/2010 |
| WO | WO 2003/091909 A1 | 11/2003 |

OTHER PUBLICATIONS

Extended European Search Report for European Application No. EP 13894578.7-1954, dated May 9, 2017.

* cited by examiner

METHOD AND SYSTEM FOR SELECTING ENCODING FORMAT FOR READING TARGET DOCUMENT

CROSS-REFERENCE TO RELATED APPLICATIONS

This application is a national application of PCT/CN2013/088745, filed on Dec. 6, 2013, which application claims a right of priority to Chinese Patent Application No. 201310456276.6, filed Sep. 29, 2013, both of which are incorporated herein by reference in their entirety.

TECHNICAL FIELD

This invention relates a method and system for selecting an encoding format for reading a target document, and belongs to the field of electronic digital data processing.

DESCRIPTION OF THE RELATED ART

Encoding format is a concept of encoding characters, digitals and other objects into codes according to a predetermined method. There are many encoding formats widely adopted in electrical computers, televisions and relevant fields. File encoding format is also referred as character encoding format, which is used for specifying how to represent characters when a text document is processed. When reading a Chinese text document, mismatched file encoding format may cause exceptions or other incorrect results. Common Chinese encoding formats comprises GB2312, BIG5, GBK, UTF-8, wherein GB2312 and UTF-8 are the most commonly used encoding formats for simplified Chinese characters.

In the Windows systems, text documents are widely used. Developers often run into a problem about Chinese encoding format when writing programs to read documents. For example, when reading a document for a subsequent process, it may be found that the result of a program is different from its anticipated result, for a simple reason determined through debugging and tracing that the encoding format used to read the document in the program is inconsistent with the encoding format of the document itself, causing disorder codes obtained by the program, and in turn subsequent errors. This situation is common in development processes. Besides, when it is required to read a large amount of documents, these documents may have different encoding formats, so that it is desirable to provide a method for selecting an encoding format for reading a target document to improve development efficiency.

According to the methods for selecting an encoding format for reading a text document in the prior art, the first several bytes in the text document are read out to determine the values of these bytes and thereby determine its encoding format. However, in some cases, there is not information about encoding format of the text document reserved in those bytes, and it is impossible to obtain encoding format of the text document in such a manner. The problem arising out of file encoding format may be greatly reduced and development efficiency may be improved if there is a mechanism of selecting a correct encoding format for reading a document.

SUMMARY OF THE INVENTION

A technical problem to be solved in this invention is that, in those methods for selecting an encoding format for reading a text document in the prior art, only first several bytes in the text document are read out to determine the values of these bytes and thereby determine its encoding format; however, in some cases, there is not information about encoding format of the text document reserved in those bytes, and it is impossible to obtain encoding format of the text document in such a manner.

In order to solve the above technical problem, this invention provides the following technical solutions.

A method for selecting an encoding format used for reading a target document, comprising: reading a reference document with at least one reference encoding format and determining all or some disorder code patterns obtained when reading the reference document with the reference encoding format; reading the target document with one encoding format each time; for each encoding format, comparing data generated when reading the target document with this encoding format and the determined disorder code patterns to determine disorder codes generated when reading the target document with this encoding format; counting disorder codes generated when reading the target document with each encoding format, and making a comparison to determine the encoding format used for reading the target document.

Optionally, the reference encoding format belongs to a set of encoding formats including al or some encoding formats, and the reference encoding format is such an encoding format in the set of encoding formats that disorder codes may be generated when reading the reference document with this encoding format.

Optionally the reference document is read with all reference encoding formats to determine all or some disorder code patterns obtained when reading the reference document with those reference encoding formats.

Optionally, the process of determining all or some disorder code patterns obtained when reading the reference document with the reference encoding format comprises: from a disorder code string obtained when reading the reference document with the reference encoding format, removing invalid determination codes in the disorder code string and obtaining valid determination codes; counting the number of times disorder codes appear in the valid determination codes to obtain a disorder code pattern.

Optionally, the invalid determination codes are English characters, numbers and blank characters; the valid determination codes are all of other codes except for the invalid determination codes.

Optionally, in the process of counting the number of times disorder codes appear in the valid determination codes to obtain a disorder code pattern, a threshold is specified in advance, wherein all disorder codes appear a number of times larger than the threshold are stored as a disorder code pattern.

Optionally, in the process of counting the number of times disorder codes appear in the valid determination codes to obtain a disorder code pattern, disorder codes are sorted in reversed order of their appearance times; some top disorder codes are selected and are saved as the disorder code pattern.

Optionally, the top k % of the disorder codes are selected and are saved as the disorder code pattern, wherein k is a positive integer and 50≤k≤100.

Optionally, only a portion of the target document is read with an encoding format each time, until a predetermined number of valid determination codes are obtained, or a number of valid determination codes that have been actually obtained is used instead if the predetermined number of valid determination codes cannot be obtained even after the complete content of the document has been read.

The number of valid determination codes is 50 to 1000.

Optionally, the process of comparing data generated when reading the target document with this encoding format and the determined disorder code patterns to determine disorder codes generated when reading the target document with this encoding format comprises: comparing each data item generated when reading the target document with each encoding format and disorder codes in the disorder code pattern one by one, if the disorder codes comprise the data item, the data item is determined as a disorder code; otherwise the data item is not a disorder code.

Optionally, the process of counting disorder codes generated when reading the target document with each encoding format, and making a comparison to determine the encoding format used for reading the target document comprises: counting a proportion of disorder codes generated when reading the target document with each encoding format and selecting an encoding format having the lowest proportion of disorder codes as the encoding format used for reading the target document; or counting a proportion of disorder codes generated when reading the target document with each encoding format and selecting an encoding format having a proportion of disorder codes less than a predetermined threshold as the encoding format used for reading the target document.

Optionally, the proportion of disorder codes is a proportion of the disorder codes to the valid determination codes.

Optionally, the encoding format used to read the target document each time belongs to the set of encoding formats.

A system for selecting an encoding format used for reading a target document, comprising: a disorder code pattern generation module for reading a reference document with at least one reference encoding format and determining all or some disorder code patterns obtained when reading the reference document with the reference encoding format; a target document reading module for reading the target document with one encoding format each time; a disorder code reading module for, with respect to each encoding format, comparing data generated when reading the target document with this encoding format and the determined disorder code patterns to determine disorder codes generated when reading the target document with this encoding format; a reading CCFF selection module for counting disorder codes generated when reading the target document with each encoding format, and making a comparison to determine the encoding format used for reading the target document.

Optionally, the reference encoding format belongs to a set of encoding formats including all or some encoding formats, and the reference encoding format is such an encoding format in the set of encoding formats that disorder codes may be generated when reading the reference document with this encoding format.

Optionally, the reference document is read with all reference encoding formats to determine all or some disorder code patterns obtained when reading the reference document with those reference encoding formats.

Optionally, the process of determining all or some disorder code patterns obtained when reading the reference document with the reference encoding format comprises: from a disorder code string obtained when reading the reference document with the reference encoding format, removing invalid determination codes in the disorder code string and obtaining valid determination codes; counting the number of times disorder codes appear in the valid determination codes to obtain a disorder code pattern.

Optionally, the invalid determination codes are English characters, numbers and blank characters; the valid determination codes are all of other codes except for the invalid determination codes.

Optionally, in the process of counting the number of times disorder codes appear in the valid determination codes to obtain a disorder code pattern, a threshold is specified in advance, wherein al disorder codes appear a number of times larger than the threshold are stored as a disorder code pattern.

Optionally, in the process of counting the number of times disorder codes appear in the valid determination codes to obtain a disorder code pattern, disorder codes are sorted in reversed order of their appearance times; some top disorder codes are selected and are saved as the disorder code pattern.

Optionally, the top k percent of the disorder codes are selected and are saved as the disorder code pattern, wherein k is a positive integer and $50 \le k \le 100$.

Optionally, only a portion of the target document is read with an encoding format each time, until a predetermined number of valid determination codes are obtained, or a number of valid determination codes that have been actually obtained is used instead if the predetermined number of valid determination codes cannot be obtained even after the complete content of the document has been read.

The number of valid determination codes is 50 to 1000.

Optionally, the process of comparing data generated when reading the target document with this encoding format and the determined disorder code patterns to determine disorder codes generated when reading the target document with this encoding format comprises: comparing each data item generated when reading the target document with each encoding format and disorder codes in the disorder code pattern one by one, if the disorder codes comprise the data item, the data item is determined as a disorder code; otherwise the data item is not a disorder code.

Optionally, the process of counting disorder codes generated when reading the target document with each encoding format, and making a comparison to determine the encoding format used for reading the target document comprises: counting a proportion of disorder codes generated when reading the target document with each encoding format and selecting an encoding format having the lowest proportion of disorder codes as the encoding format used for reading the target document; or counting a proportion of disorder codes generated when reading the target document with each encoding format and selecting an encoding format having a proportion of disorder codes less than a predetermined threshold as the encoding format used for reading the target document.

Optionally, the proportion of disorder codes is a proportion of the disorder codes to the valid determination codes.

Optionally, the encoding format used to read the target document each time belongs to the set of encoding formats.

One or more computer readable mediums having stored thereon computer-executable instructions that when executed by a method for selecting an encoding format used for reading a target document, the method comprising: reading a reference document with at least one reference encoding format and determining all or some disorder code patterns obtained when reading the reference document with the reference encoding format; reading the target document with one encoding format each time; for each encoding format, comparing data generated when reading the target document with this encoding format and the determined disorder code patterns to determine disorder codes generated when reading the target document with this encoding format; counting disorder codes generated when reading the target document with each encoding format, and making a comparison to determine the encoding format used for reading the target document.

The above technical solutions of this disclosure have one or more following advantages over the prior art:

(1) in the method and system for selecting an encoding format used for reading a target document of this disclosure, through reading a reference document with at least one reference encoding format and determining all or some disorder code patterns obtained when reading the reference document with the reference encoding format; reading the target document with one encoding format each time; for each encoding format, comparing data generated when reading the target document with this encoding format and the determined disorder code patterns to determine disorder codes generated when reading the target document with this encoding format; counting disorder codes generated when reading the target document with each encoding format, and making a comparison to determine the encoding format used for reading the target document, a problem in the prior art, i.e., only first several bytes in the text document are read out to determine the values of these bytes and thereby determine its encoding format; however, in some cases, there is not information about encoding format of the text document reserved in those bytes, and it is impossible to obtain encoding format of the text document in such a manner may be effectively avoided.

(2) in the method for selecting an encoding format used for reading a target document of this disclosure, in the process of obtaining the disorder code pattern, invalid determination codes are removed from the disorder code string obtained when reading the reference document with the reference encoding format to reduce the number of characters to be processed, thereby further improving the processing speed and the accuracy of obtaining disorder codes.

(3) in the method for selecting an encoding format used for reading a target document of this disclosure, disorder codes having a larger number of times of appearance are selected according to a certain proportion to filter out some uncommon disorder codes, thereby improving the efficiency of subsequently selecting an encoding format used for reading the target document.

(4) in the method for selecting an encoding format used for reading a target document of this disclosure, an encoding format is selected for reading the target document in a manner of minimizing the proportion of the disorder codes, which is ingenious, simple and easy to implement.

(5) in the method for selecting an encoding format used for reading a target document of this disclosure, through selecting an encoding format generating a proportion of disorder codes that is less than a predetermined threshold as the encoding format used for reading the target document, a long time that must be taken for selecting an proper encoding format as the result of reading the target document with all encoding formats may be avoided, thereby further improving the efficiency of selecting an encoding format used for reading the target document.

(6) in the method for selecting an encoding format used for reading a target document of this disclosure, only a portion of the target document is read with an encoding format each time, until a predetermined number of valid determination codes have been obtained, so that representative codes may be obtained and the efficiency of selecting an encoding format used for reading the target document may be further improved.

(7) in the system for selecting an encoding format used for reading a target document of this disclosure, using the method for selecting an encoding format used for reading a target document described in this disclosure, a problem in the prior art, i.e., only first several bytes in the text document are read out to determine the values of these bytes and thereby determine its encoding format; however, in some cases, there is not information about encoding format of the text document reserved in those bytes, and it is impossible to obtain encoding format of the text document in such a manner may be effectively avoided.

BRIEF DESCRIPTION OF THE DRAWINGS

For an easier and clear understanding of this invention, a further description of this invention will be given below with reference to the accompanying drawings, in which.

DETAILED DESCRIPTION OF THE PREFERRED EMBODIMENT

Embodiment 1

Figure 1:
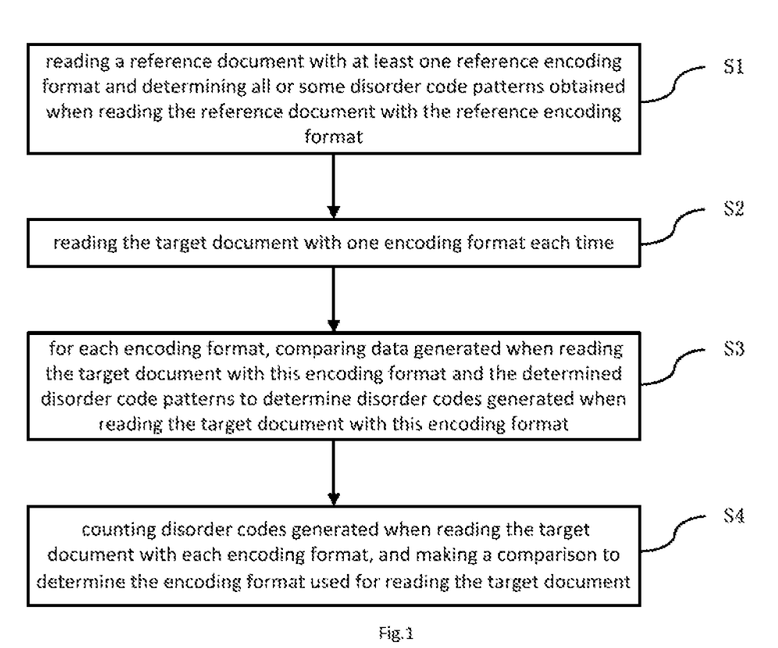
FIG. 1 is a flowchart of a method for selecting an encoding format used for reading a target document according to an embodiment of this invention.

This embodiment provides a method for selecting an encoding format used for reading a target document. FIG. 1 shows a flowchart of the method, which comprises the following steps:

S1: reading a reference document with at least one reference encoding format and determining all or some disorder code patterns obtained when reading the reference document with the reference encoding format. In this embodiment, the document is a text document. The reference encoding format belongs to a set of encoding formats including all encoding formats.

In an embodiment, the process of determining all or some disorder code patterns obtained when reading the reference document with the reference encoding format comprises: from a disorder code string obtained when reading the reference document with the reference encoding format, removing invalid determination codes in the disorder code string and obtaining valid determination codes; counting the number of times disorder codes appear in the valid determination codes to obtain a disorder code pattern. Wherein, the invalid determination codes are English characters, numbers and blank characters, and the valid determination codes are all of other codes except for the invalid determination codes.

In the process of obtaining disorder code patterns of this embodiment, invalid determination codes are removed from a disorder code string obtained when reading the reference document with the reference encoding format to reduce the number of characters to be processed, thereby further improving the processing speed and the accuracy of obtaining disorder codes.

Preferably, in the process of counting the number of times disorder codes appear in the valid determination codes to obtain a disorder code pattern, a threshold is specified in advance, wherein all disorder codes appear a number of times larger than the threshold are stored as a disorder code pattern.

In this embodiment, disorder codes having a larger number of times of appearance are selected according to a certain proportion to filter out some uncommon disorder codes, thereby improving the efficiency of subsequently selecting an encoding format used for reading the target document.

Preferably, in the process of counting the number of times disorder codes appear in the valid determination codes to obtain a disorder code pattern, disorder codes are sorted in reversed order of their appearance times; some top disorder codes are selected and are saved as the disorder code pattern. For example, the top k percent of the disorder codes are selected and are saved as the disorder code pattern, wherein k is a positive integer and $50 \leq k \leq 100$. In this embodiment, 80% of the top disorder codes are selected, and these disorder codes are the disorder code pattern to be obtained.

In alternative embodiments, the top k percent of the disorder codes are selected and are saved as the disorder code pattern. Wherein, k is a positive integer in a range of $60 \leq k \leq 90$. K may have a value of 60, 70, 75, 90 or other different value selected as needed by users.

S2: reading a portion of the target document with an encoding format each time, until a predetermined number of valid determination codes are obtained. The encoding format belongs to a set of encoding formats, i.e., the set of encoding formats described above the reference encoding format belongs to. Because the reference encoding format and the encoding format selected for reading the target document belong to the same set, for those encoding formats having established disorder code patterns, in selecting and reading process, a higher identification rate of disorder codes may be achieved based on a disorder code pattern. Instead of a predetermined number of valid determination codes, a number of valid determination codes that have been actually obtained is used if the predetermined number of valid determination codes cannot be obtained even after the complete content of the document has been read. The number of valid determination codes is 50 to 1000. Preferably, the number of valid determination codes is 100. In alternative embodiments, the number of valid determination codes may be 70, 150, 200, 300, 500, 700, 1000 or other different value selected as needed by users.

In the method for selecting an encoding format used for reading a target document of this disclosure, only a portion of the target document is read with an encoding format each time, until a predetermined number of valid determination codes have been obtained, so that representative codes may be obtained and the efficiency of selecting an encoding format used for reading the target document may be further improved.

S3: for each encoding format, comparing data generated when reading the target document with this encoding format and the determined disorder code patterns to determine disorder codes generated when reading the target document with this encoding format.

In an embodiment, this process particularly comprises: comparing each data item generated when reading the target document with each encoding format and disorder codes in the disorder code pattern one by one, if the disorder codes comprise the data item, the data item is determined as a disorder code; otherwise the data item is not a disorder code.

S4: counting disorder codes generated when reading the target document with each encoding format, and making a comparison to determine the encoding format used for reading the target document.

In an embodiment, this process particularly comprises: counting a proportion of disorder codes generated when reading the target document with each encoding format and selecting an encoding format having the lowest proportion of disorder codes as the encoding format used for reading the target document. Wherein, the proportion of disorder codes is a proportion of the disorder codes to the valid determination codes.

In the method for selecting an encoding format used for reading a target document of this embodiment, an encoding format is selected for reading the target document in a manner of minimizing the proportion of the disorder codes, which is ingenious, simple and easy to implement.

Preferably, a proportion of disorder codes generated when reading the target document with each encoding format is counted and an encoding format having a proportion of disorder codes less than a predetermined threshold is selected as the encoding format used for reading the target document.

In the method for selecting an encoding format used for reading a target document of this embodiment, through selecting an encoding format generating a proportion of disorder codes that is less than a predetermined threshold as the encoding format used for reading the target document, a long time that must be taken for selecting an proper encoding format as the result of reading the target document with all encoding formats may be avoided, thereby further improving the efficiency of selecting an encoding format used for reading the target document.

In the method and system for selecting an encoding format used for reading a target document of this disclosure, through reading a reference document with at least one reference encoding format and determining all or some disorder code patterns obtained when reading the reference document with the reference encoding format; reading the target document with one encoding format each time; for each encoding format, comparing data generated when reading the target document with this encoding format and the determined disorder code patterns to determine disorder codes generated when reading the target document with this encoding format; counting disorder codes generated when reading the target document with each encoding format, and making a comparison to determine the encoding format used for reading the target document, a problem in the prior art, i.e., only first several bytes in the text document are read out to determine the values of these bytes and thereby determine its encoding format; however, in some cases, there is not information about encoding format of the text document reserved in those bytes, and it is impossible to obtain encoding format of the text document in such a manner may be effectively avoided.

Embodiment 2

First step: collect 500 reference documents; read the reference documents with at least one reference encoding format and determining all or some disorder code patterns obtained when reading the reference documents with the reference encoding format.

A document selected from the reference documents described above is read with the UTF-8 encoding format. For example, the original document comprises text ",  happy!". The encoding format of this text document is UTF-8, and "

,

◆ happy " is obtained if the document is read with the GB2312 encoding format. Invalid determination codes "yhappy" are deleted and the remaining codes are valid determination codes "  ". After which it is determined whether these codes are disorder codes and corresponding calculation is performed.

A document selected from the reference documents described above is read with the GB2312 encoding format. For example, the original document comprises text "我的体重很重, 75 千克, 我老婆的体重很轻, 才 38 千克。". The encoding format of this text document is GB2312, and "�ҵ�����������75 ���ˣ������ŵ�����������38 �ǧ��" is obtained if the document is read with the UTF-8 encoding format. Invalid determination codes "7538" are deleted and the remaining codes are valid determination codes "�ҵ������������ ������������ �������� �����". After which it is determined whether these codes are disorder codes and corresponding calculation is performed.

These 500 reference documents are read with UTF-8 and GB2312 one by one respectively, and the number of times disorder codes appear in the valid determination codes is counted. 80% of the top disorder codes "������������������" are selected and these disorder codes are saved as a disorder code pattern.

Second step: read a portion of a target document with the UTF-8 encoding format and 100 valid determination codes are obtained when the 112$^{th}$ character is read; then, read the target document with the GB2312 encoding format to obtain 100 valid determination codes.

Third step: compare each data item generated when reading the target document with each of the UTF-8 encoding format and the GB2312 encoding format and disorder codes in the disorder code pattern, and determine disorder codes generated when reading the target document with the encoding format.

Fourth step: as to the data obtained when reading the target document with the UTF-8 encoding format, it is determined based on the disorder code pattern that the number of disorder codes among the 100 valid determination codes is 86, and the proportion of disorder codes is 86%, as to the data obtained when reading the target document with the GB2312 encoding format, and the proportion of disorder codes is 0%, thereby the GB2312 encoding format having the lowest proportion of disorder codes is selected as the encoding format of the target document.

Embodiment 3

This embodiment provides a method for selecting an encoding format used for reading a chinese text document, which comprises two stages: a first stage of obtaining a disorder code pattern by statistics, and a second stage of selecting an encoding format used for reading a target document.

In this embodiment, invalid determination codes are English characters (including upper and lower cases), numbers and blank characters (including Space, Tab, Newline characters); valid determination codes are non-English characters (including upper and lower cases), numbers and blank characters (including Space, Tab, Newline characters). In this embodiment, a file encoding format is selected from a set of encoding formats as a reference encoding format, the set of encoding formats being $C=\{c_1, c_2, \ldots c_k\}$, wherein $c_i$ is an encoding format of Chinese text documents and is used as a reference encoding format to read a reference document.

First stage: obtain a disorder code pattern by statistics.

Step 1: collect Chinese training documents, and form a set of reference documents from a Chinese training corpus $D=\{(d_1, d_2, \ldots d_n\}$, wherein $d_i$ is a Chinese text document, i.e., a reference encoding format in this embodiment. The encoding format of a file $d_i$ is represented as $f(d_i)$, $f(d_i) \in C$. An encoding format causing disorder codes when the file $d_i$ is read with this encoding format is a reference encoding format, and the set of reference encoding formats is represented as $C_i'$, $C_i' \subseteq C\backslash f(d_i)$, i.e., disorder codes may be generated when the file $d_i$ is read with an encoding format in $C_i'$.

Step 2: given a reference document $d_i$, read this document with different encoding formats in C; to obtain a plurality of disorder code strings.

Step 3: delete invalid determination codes in the disorder code strings.

Step 4: count a number of times each disorder code appears in the disorder code strings.

Step 5: for each reference document $d_i \in D$, repeat step 2 to step 4 to count a number of times of appearance of each disorder code.

Step 6: sort the disorder codes in reversed order of their appearance times.

Step 7: select the top m % disorder codes as the disorder code pattern to be obtained. This disorder code pattern comprises common features of disorder codes with respect to the set of encoding formats $C=\{c_1, c_2, \ldots c_k\}$. The value of m is larger than or equal to 50 and less than 100. The value of m is between 60 and 90.

Second stage: selecting an encoding format used for reading a target document. Herein, the reference document is also a Chinese text document. This stage may be implemented in two ways. As a first way:

Step 1: select an encoding format $c_i$ from the set of encoding formats C, read a portion of the target document with the encoding format $c_i$ to obtain the first n valid determination codes. If the number of valid determination codes is still less than n until the complete document has been read, the number of codes that have been particularly obtained is used instead. Given that m valid determination codes are obtained in this stage. The value of n is larger than or equal to 10 and is in a range of [50, 1000].

Step 2: count the number m' of disorder codes in m valid determination codes based on the disorder code pattern and calculate a proportion of disorder codes m'/m; add the encoding format $c_i$ and the proportion of disorder codes m'/m into a list L a method of counting disorder codes comprises: setting m' to 0; reading each code of the m codes, if the code belongs to the disorder code pattern, increasing m' by 1; traversing the m codes to obtain the number of disorder codes which is the value of m'.

Step 3: for other encoding formats in the set of encoding formats C, repeat step 1 to step 2.

Step 4: return an encoding format having a minimal proportion of disorder codes in the list L as the encoding format used for reading the target document.

As an alternative way, the second stage may be implemented as follows:

Step 1: select an encoding format $c_i$ from the set of encoding formats C, read a portion of the target document with the encoding format $c_i$ to obtain first n valid determination codes. If the number of valid determination codes is still less than n until the complete document has been read, the number of codes that have been particularly obtained is used instead. Given that m valid determination codes are obtained in this stage. The value of n is larger than or equal to 10 and is in a range of [50, 1000].

Step 2: count the number m' of disorder codes in m valid determination codes based on the disorder code pattern and calculate a proportion of disorder codes m'/m. A method of counting disorder codes comprises: setting m' to 0; reading each code of the m codes, if the code belongs to the disorder code pattern, increasing m' by 1; traversing the m codes to obtain the number of disorder codes which is the value of m'.

Step 3: if the proportion of disorder codes m'/m is larger than or equal to a threshold $\xi$ step 1 and step 2 are repeated.

If the proportion of disorder codes m'/m is less than the threshold $\xi$, return the encoding format $c_i$. The value of the threshold $\xi$ is larger than or equal to 1%. The value of the threshold $\xi$ is in a range of 5% to 50%. In this embodiment, the value of the threshold $\xi$ is 15%.

In this embodiment, a disorder code pattern is obtained statistically and an encoding format used for reading the target document (a Chinese text document) is automatically selected based on the disorder code pattern.

Embodiment 4

This embodiment provides a method for selecting an encoding format used for reading a target document, which comprises two stages, particularly as follows.

First stage: obtain a disorder code pattern by statistics. A set of encoding formats concerned is (UTF-8, GB82312).

Step 1: collect 1000 Chinese text documents as reference documents, which are used as Chinese training resources, wherein 500 documents are UTF8 encoded and other 500 documents are GB2312 encoded. In this embodiment, these Chinese text documents are text documents having a suffix ".txt".

Step 2: select a UTF-8 document and read this document with the GB2312 encoding format to obtain a disorder code string.

Step 3: delete invalid determination codes from the disorder code string.

Step 4: count the number of times of appearance of various codes in the disorder code string.

Step 5: for each document, repeat step 2 to step 4 and count the number of times of appearance of various disorder codes.

Step 6: sort the disorder codes in reversed order of their appearance times.

Step 7: select the top 80% disorder codes and these disorder codes are the disorder code pattern to be obtained. This disorder code pattern comprises common features of disorder codes with respect to the set of encoding formats concerned (UTF-8, GB82312). The obtain disorder code pattern is [◆济淌舘紅鐵疲泜鐽錜].

Second stage: select an encoding format for the target document.

Step 1: select UTF-8 from the set of encoding formats concerned (UTF-8, GB2312), and read the first 100 valid determination codes of the target document with UTF-8.

Step 2: count the number (86) of disorder codes in the 100 valid determination codes based on the disorder code pattern and obtain a proportion (86%) of disorder codes through calculation; add an entry (UTF-8, 86%) in a list L.

Step 3: with the encoding format GB2312, repeat step 1 and step 2; and add an entry (GB2312, 0%) in the list L.

Step 4: return an encoding format having the minimal proportion of disorder codes in the list L, i.e., GB2312 as the encoding format used for reading the target document. Thereby, it is most likely to read the content of the target document with GB2312 correctly.

As an alternative embodiment, the second stage may be also implemented in the following manner:

Step 1: select UTF-8 from the set of encoding formats concerned (UTF-8, GB2312), and read the first 100 valid determination codes of the target document with UTF-8.

Step 2: count the number (86) of disorder codes in the 100 valid determination codes based on the disorder code pattern and obtain a proportion (86%) of disorder codes through calculation.

Step 3: set a threshold $\xi$ to 15%; because the proportion of disorder codes is 86% and is larger than the threshold $\xi$, repeat step 1 and step 2 with the encoding format GB2312; a proportion of disorder codes of 0% is obtained, which is less than the threshold $\xi$ and the encoding format GB2312 is returned as the encoding format used for reading the target document.

Embodiment 5

Figure 2:
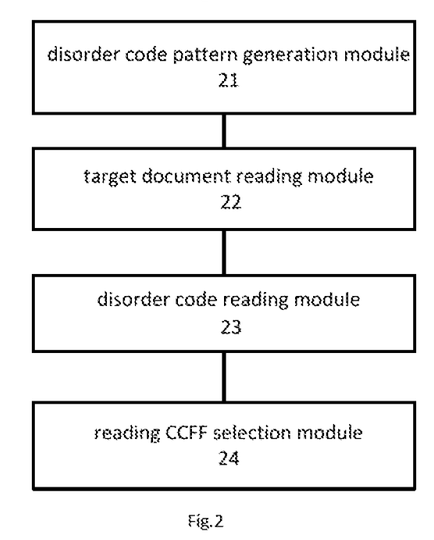
FIG. 2 is a structural diagram of a system for selecting an encoding format used for reading a target document according to an embodiment of this invention.

FIG. 2 is a structural diagram of a system for selecting an encoding format used for reading a target document according to this invention. This embodiment provides a system for selecting an encoding format used for reading a target document, comprising:

a disorder code pattern generation module 21 for reading a reference document with at least one reference encoding format and determining all or some disorder code patterns obtained when reading the reference document with the reference encoding format. The reference encoding format belongs to a set of encoding formats including all or some encoding formats, and the reference encoding format is such an encoding format in the set of encoding formats that disorder codes may be generated when reading the reference document with this encoding format.

The process of determining all or some disorder code patterns obtained when reading the reference document with the reference encoding format comprises: from a disorder code string obtained when reading the reference document with the reference encoding format, removing invalid determination codes in the disorder code string and obtaining valid determination codes; counting the number of times disorder codes appear in the valid determination codes to obtain a disorder code pattern. Wherein, the invalid determination codes are English characters, numbers and blank characters; the valid determination codes are all of other codes except for the invalid determination codes.

In the process of obtaining the disorder code pattern in this embodiment, invalid determination codes are removed from the disorder code string obtained when reading the reference document with the reference encoding format to reduce the number of characters to be processed, thereby further improving the processing speed and the accuracy of obtaining disorder codes.

Optionally, in the process of counting the number of times disorder codes appear in the valid determination codes to obtain a disorder code pattern, a threshold is specified in advance, wherein all disorder codes appear a number of times larger than the threshold are stored as a disorder code pattern.

In this embodiment, disorder codes having a larger number of times of appearance are selected according to a certain proportion to filter out some uncommon disorder codes, thereby improving the efficiency of subsequently selecting an encoding format used for reading the target document.

Optionally, in the process of counting the number of times disorder codes appear in the valid determination codes to obtain a disorder code pattern, disorder codes are sorted in reversed order of their appearance times; some top disorder codes are selected and are saved as the disorder code pattern. Optionally, the top k percent of the disorder codes are selected and are saved as the disorder code pattern, wherein k is a positive integer and 50≤k≤100. In this embodiment, 80% of the top disorder codes are selected, and these disorder codes are the disorder code pattern to be obtained.

In other embodiments, the top k percent of the disorder codes are selected and are saved as the disorder code pattern. Wherein, k is a positive integer in a range of 60≤k≤90. K may have a value of 60, 70, 75, 90 or other different value selected as needed by users.

a target document reading module 22 for reading the target document with one encoding format each time. This module read the target document until a predetermined number of valid determination codes are obtained. The encoding formats belong to a set of encoding formats the reference encoding format belongs to.

Instead of a predetermined number of valid determination codes, the number of valid determination codes that have been actually obtained is used if the predetermined number of valid determination codes cannot be obtained even after the complete contents of all documents have been read. The number of valid determination codes is 50 to 1000. Preferably, the number of valid determination codes is 100. In alternative embodiments, the number of valid determination codes may be 70, 150, 200, 300, 500, 700, 1000 or other different value selected as needed by users.

a disorder code reading module 23 for, with respect to each encoding format, comparing data generated when reading the target document with this encoding format and the determined disorder code patterns to determine disorder codes generated when reading the target document with this encoding format.

This process particularly comprises: comparing each data item generated when reading the target document with each encoding format and disorder codes in the disorder code pattern one by one, if the disorder codes comprise the data item, the data item is determined as a disorder code; otherwise the data item is not a disorder code.

Preferably, from a disorder code string obtained when reading the reference document with the reference encoding format, invalid determination codes in the disorder code string are removed to obtain valid determination codes; the number of times disorder codes appear in the valid determination codes is counted to obtain a disorder code pattern.

a reading CCFF selection module 24 for counting disorder codes generated when reading the target document with each encoding format, and making a comparison to determine the encoding format used for reading the target document.

This process particularly comprises: counting a proportion of disorder codes generated when reading the target document with each encoding format and selecting an encoding format having the lowest proportion of disorder codes as the encoding format used for reading the target document.

Preferably, a proportion of disorder codes generated when reading the target document with each encoding format is counted and an encoding format having a proportion of disorder codes less than a predetermined threshold is selected as the encoding format used for reading the target document. Wherein, the proportion of disorder codes is a proportion of the disorder codes to the valid determination codes that have been read.

In the system for selecting an encoding format used for reading a target document of this embodiment, using the method for selecting an encoding format used for reading a target document described in this disclosure, a problem in the prior art, i.e., only first several bytes in the text document are read out to determine the values of these bytes and thereby determine its encoding format; however, in some cases, there is not information about encoding format of the text document reserved in those bytes, and it is impossible to obtain encoding format of the text document in such a manner may be effectively avoided.

Obviously, the above embodiments are merely examples given for clear description, but not limitations of this invention. For those skilled in the art, other modifications or variations may be made based on the above description, which will not be and cannot be listed exhaustively herein. These apparent modifications or variations derived are still within the protection scope of this invention.

Those skilled in the art should understand that the embodiments of this application can be provided as method, system or products of computer programs. Therefore, this application can use the forms of entirely hardware embodiment, entirely software embodiment, or embodiment combining software and hardware. Moreover, this application can use the form of the product of computer programs to be carried out on one or multiple storage media (including but not limit to disk memory, CD-ROM, optical memory etc.) comprising programming codes that can be executed by computers.

This application is described with reference to the method, equipment (system) and the flow charts and/or block diagrams of computer program products according to the embodiments of the present invention. It should be understood that each flow and/or block in the flowchart and/or block diagrams as well as the combination of the flow and/or block in the flowchart and/or block diagram can be achieved through computer program commands Such computer program commands can be provided to general computers, special-purpose computers, embedded processors or any other processors of programmable data processing equipment so as to generate a machine, so that a device for realizing one or multiple flows in the flow diagram and/or the functions specified in one block or multiple blocks of the block diagram is generated by the commands to be executed by computers or any other processors of the programmable data processing equipment.

Such computer program commands can also be stored in readable memory of computers which can lead computers or other programmable data processing equipment to working in a specific style so that the commands stored in the readable memory of computers generate the product of command device; such command device can achieve one or multiple flows in the flowchart and/or the functions specified in one or multiple blocks of the block diagram.

Such computer program commands can also be loaded on computers or other programmable data processing equipment so as to carry out a series of operation steps on computers or other programmable equipment to generate the process to be achieved by computers, so that the commands to be executed by computers or other programmable equipment achieve the one or multiple flows in the flowchart and/or the functions specified in one block or multiple blocks of the block diagram.

Although preferred embodiments of this application are already described, once those skilled in the art understand basic creative concept, they can make additional modification and alteration for these embodiments. Therefore, the appended claims are intended to be interpreted as encompassing preferred embodiments and all the modifications and alterations within the scope of this application.

What is claimed is:

1. A method for selecting an encoding format used for reading a target document, characterized in comprising:
reading each reference document with at least two reference encoding formats in a set of multiple encoding format and determining a disorder code pattern, comprising:
reading the reference document with the reference encoding format to obtain a disorder code string,
removing invalid determination codes in the disorder code string and obtaining valid determination codes, counting the number of times disorder codes appear in the valid determination codes to obtain the disorder code pattern, wherein all disorder codes appear a number of times larger than a threshold are stored as the disorder code pattern, the invalid determination codes being English characters, numbers and blank characters, and the valid determination codes being all of other codes except for the invalid determination codes;

reading the target document with at least two encoding formats;

for each encoding format, comparing data generated when reading the target document with this encoding format and the determined disorder code patterns to determine disorder codes generated when reading the target document with this encoding format;

counting a proportion of disorder codes generated when reading the target document with each encoding format and selecting an encoding format having a proportion of disorder codes less than a predetermined threshold as the encoding format used for reading the target document.

2. The method of selecting an encoding format used for reading a target document according to claim 1, wherein the reference encoding format belongs to a set of encoding formats including all or some encoding formats, and the reference encoding format is such an encoding format in the set of encoding formats that disorder codes may be generated when reading the reference document with this encoding format.

3. The method of selecting an encoding format used for reading a target document according to claim 1, wherein the reference document is read with all encoding formats in the set of multiple encoding format to determine the disorder code patterns obtained when reading the reference document with those reference encoding formats.

4. The method of selecting an encoding format used for reading a target document according to claim 1, wherein, in the process of counting the number of times disorder codes appear in the valid determination codes to obtain a disorder code pattern, disorder codes are sorted in reversed order of their appearance times; the top k% disorder codes are selected and are saved as the disorder code pattern, wherein k is $50 \leq k \leq 100$.

5. The method of selecting an encoding format used for reading a target document according to claim 1, wherein only a portion of the target document is read with an encoding format each time, until a predetermined number of valid determination codes are obtained, or a number of valid determination codes that have been actually obtained is used instead if the predetermined number of valid determination codes cannot be obtained even after the complete content of the document has been read.

6. The method of selecting an encoding format used for reading a target document according to claim 1, wherein the process of comparing data generated when reading the target document with this encoding format and the determined disorder code patterns to determine disorder codes generated when reading the target document with this encoding format comprises:

comparing each data item generated when reading the target document with each encoding format and disorder codes in the disorder code pattern one by one, if the disorder codes comprise the data item, the data item is determined as a disorder code; otherwise the data item is not a disorder code.

7. The method of selecting an encoding format used for reading a target document according to claim 1, wherein the process of counting disorder codes generated when reading the target document with each encoding format comprises:

counting a proportion of disorder codes generated when reading the target document with each encoding format and selecting an encoding format having the lowest proportion of disorder codes as the encoding format used for reading the target document.

8. The method of selecting an encoding format used for reading a target document according to claim 7, wherein the proportion of disorder codes is a proportion of the disorder codes to the valid determination codes.

9. A system for selecting an encoding format used for reading a target document in a computer, comprising:

a memory device; and a processor coupled to the memory device, which is configured to execute instructions stored in the memory device that cause the processor to perform operations comprising:

reading each reference document with at least two reference encoding formats in a set of multiple encoding format and determining a disorder code patterns, comprising:

reading the reference document with the reference encoding format to obtain a disorder code string, removing invalid determination codes in the disorder code string and obtaining valid determination codes, counting the number of times disorder codes appear in the valid determination codes to obtain the disorder code pattern, wherein all disorder codes appear a number of times larger than a threshold are stored as the disorder code pattern, the invalid determination codes being English characters, numbers and blank characters, and the valid determination codes being all of other codes except for the invalid determination codes;

reading the target document with at least two encoding formats;

with respect to each encoding format, comparing data generated when reading the target document with this encoding format and the determined disorder code patterns to determine disorder codes generated when reading the target document with this encoding format;

counting a proportion of disorder codes generated when reading the target document with each encoding format and selecting an encoding format having a proportion of disorder codes less than a predetermined threshold as the encoding format used for reading the target document.

10. The system for selecting an encoding format used for reading a target document according to claim 9, wherein the reference encoding format belongs to a set of encoding formats including all or some encoding formats, and the reference encoding format is such an encoding format in the set of encoding formats that disorder codes may be generated when reading the reference document with this encoding format.

11. The system for selecting an encoding format used for reading a target document according to claim 10, wherein the reference document is read with all encoding formats in the set of multiple encoding format to determine the disorder code patterns obtained when reading the reference document with those reference encoding formats.

12. The system for selecting an encoding format used for reading a target document according to claim 9, wherein, in the process of counting the number of times disorder codes appear in the valid determination codes to obtain a disorder code pattern, disorder codes are sorted in reversed order of their appearance times; the top k% disorder codes are selected and are saved as the disorder code pattern, wherein k is 5≤k≤100.

13. The system for selecting an encoding format used for reading a target document according to claim 9, wherein obtained, or a number of valid determination codes that have been actually obtained is used instead if the predetermined number of valid determination codes cannot be obtained even after the complete content of the document has been read.

14. The system for selecting an encoding format used for reading a target document according to claim 9, wherein the process of comparing data generated when reading the target document with this encoding format and the determined disorder code patterns to determine disorder codes generated when reading the target document with this encoding format comprises:
    comparing each data item generated when reading the target document with each encoding format and disorder codes in the disorder code pattern one by one, if the disorder codes comprise the data item, the data item is determined as a disorder code; otherwise the data item is not a disorder code.

15. The system for selecting an encoding format used for reading a target document according to claim 9, wherein the process of counting disorder codes generated when reading the target document with each encoding format comprises:
    counting a proportion of disorder codes generated when reading the target document with each encoding format and selecting an encoding format having the lowest proportion of disorder codes as the encoding format used for reading the target document.

16. One or more non-transitory computer readable mediums having stored thereon computer-executable instructions that when executed perform a method for selecting an encoding format used for reading a target document, the method comprising:
    reading each reference document with at least two reference encoding formats in a set of multiple encoding format and determining a disorder code pattern, comprising:
    reading the reference document with the reference encoding format to obtain a disorder code string,
    removing invalid determination codes in the disorder code string and obtaining valid determination codes,
    counting the number of times disorder codes appear in the valid determination codes to obtain the disorder code pattern, wherein all disorder codes appear a number of times larger than a threshold are stored as the disorder code pattern, the invalid determination codes being English characters, numbers and blank characters, and the valid determination codes being all of other codes except for the invalid determination codes;
    reading the target document with at least two encoding formats;
    for each encoding format, comparing data generated when reading the target document with this encoding format and the determined disorder code patterns to determine disorder codes generated when reading the target document with this encoding format;
    counting a proportion of disorder codes generated when reading the target document with each encoding format and selecting an encoding format having a proportion of disorder codes less than a predetermined threshold as the encoding format used for reading the target document.

* * * * *